United States Patent
Verma et al.

(10) Patent No.: US 11,500,659 B2
(45) Date of Patent: Nov. 15, 2022

(54) SYSTEM AND METHOD FOR VIRTUAL MACHINE AND VIRTUAL DESKTOP ACCESSIBILITY

(71) Applicant: VMWARE, INC., Palo Alto, CA (US)

(72) Inventors: Shubham Verma, Bangalore (IN); Prabhakara Rao Narnakaje Venugopala, Bangalore (IN); Samdeep Nayak, Bangalore (IN)

(73) Assignee: INTUIT, INC., Mountain View, CA (US)

( * ) Notice: Subject to any disclaimer, the term of this patent is extended or adjusted under 35 U.S.C. 154(b) by 133 days.

(21) Appl. No.: 16/282,397

(22) Filed: Feb. 22, 2019

(65) Prior Publication Data
US 2020/0183713 A1 Jun. 11, 2020

(30) Foreign Application Priority Data
Dec. 10, 2018 (IN) .............................. 201841046595

(51) Int. Cl.
*G06F 9/451* (2018.01)
*G06F 9/455* (2018.01)

(52) U.S. Cl.
CPC .............. *G06F 9/453* (2018.02); *G06F 9/452* (2018.02); *G06F 9/45558* (2013.01)

(58) Field of Classification Search
CPC ...... G06F 9/452; G06F 9/453; G06F 9/45558; H04N 19/103; H04N 19/156; H04N 19/172; H04N 19/436
See application file for complete search history.

(56) References Cited

U.S. PATENT DOCUMENTS

| | | | |
|---|---|---|---|
| 6,624,803 B1 | 9/2003 | Vanderheiden et al. | |
| 10,776,236 B1* | 9/2020 | Kudrin | H04L 67/025 |
| 10,848,568 B1* | 11/2020 | Ozerov | G06F 1/3234 |
| 2002/0097264 A1 | 7/2002 | Dutta et al. | |
| 2007/0250697 A1* | 10/2007 | Lai | G06F 11/30 714/E11.179 |
| 2010/0269135 A1* | 10/2010 | Hulse | H04N 21/254 725/37 |
| 2011/0246924 A1* | 10/2011 | Cohen | G06F 3/04812 715/772 |
| 2012/0011445 A1* | 1/2012 | Gilboa | G06F 3/0481 715/740 |

(Continued)

OTHER PUBLICATIONS

Kahn et al. "Supporting Accessibility with a Cloud-Based Environment". Jun. 5, 2017. Educause Review, pp. 1-4 and 9 (Year: 2017).*

(Continued)

*Primary Examiner* — Lewis A Bullock, Jr.
*Assistant Examiner* — Melissa A Headly
(74) *Attorney, Agent, or Firm* — Patterson & Sheridan, LLP (57) ABSTRACT

The disclosure provides an approach for processing frames of a virtualized desktop to improve accessibility for users, such as users with disabilities. The approach involves processing frames by an accessibility engine that is located on a client device of the user. The virtualized desktop runs on a virtual machine that is remote to the client device. The location of the accessibility engine on the client device allows advantages such as the ability to process frames that indicate a non-operational virtual machine.

17 Claims, 5 Drawing Sheets

(56) References Cited

U.S. PATENT DOCUMENTS

| | | | | |
|---|---|---|---|---|
| 2014/0325054 | A1* | 10/2014 | Agrawal | G06F 11/3409 |
| | | | | 709/224 |
| 2015/0082179 | A1* | 3/2015 | Ayanam | G06F 11/3006 |
| | | | | 715/736 |
| 2015/0356773 | A1* | 12/2015 | Kumar | G09G 5/14 |
| | | | | 345/520 |
| 2016/0041834 | A1* | 2/2016 | Lee | G06F 9/452 |
| | | | | 718/1 |
| 2016/0179635 | A1* | 6/2016 | Kondalsamy | G06F 11/3006 |
| | | | | 714/4.12 |
| 2016/0308951 | A1* | 10/2016 | Jiang | G06F 9/45558 |
| 2017/0346864 | A1* | 11/2017 | Nataros | H04L 65/80 |
| 2018/0255325 | A1* | 9/2018 | Rombakh | H04N 19/44 |
| 2019/0057000 | A1* | 2/2019 | Wszolek | G06F 11/0772 |
| 2019/0132643 | A1* | 5/2019 | Walls | H04N 5/268 |

OTHER PUBLICATIONS

Abeysundara, Bandula et al. "Performance Measurements and Tools in a VDI Environment—Our Experiences." Nov. 2014. Performance and Capacity 2014. pp. 3 and 7-10. (Year: 2014).*

* cited by examiner

SYSTEM AND METHOD FOR VIRTUAL MACHINE AND VIRTUAL DESKTOP ACCESSIBILITY

RELATED APPLICATIONS

Benefit is claimed under 35 U.S.C. 119(a)-(d) to Foreign Application Serial No. 201841046595 filed in India entitled "SYSTEM AND METHOD FOR VIRTUAL MACHINE AND VIRTUAL DESKTOP ACCESSIBILITY", on Dec. 10, 2018, by VMware, Inc., which is herein incorporated in its entirety by reference for all purposes.

BACKGROUND

Computer accessibility software helps users who have disabilities to use a computer, such as by reading text aloud or magnifying portions of the screen for vision-impaired users. Current accessibility software solutions have a number of limitations. Accessibility software is usually an application running on top of a computer's operating system (OS). If the computer freezes, the operating system freezes also, which prevents the accessibility software from operating. Non-operational accessibility software cannot inform a disabled user that the computer has frozen. Additionally, some OSs do not support accessibility applications. An OS with a command line interface and no graphical user interface component does not support a screen magnification feature in which a certain area around the mouse is magnified for vision impaired users. Another limitation of accessibility software arises when the software is a component of the computer's OS. With this design, the software cannot be available for plug-in development, because of security features of the OS.

SUMMARY

Embodiments provide a method of processing an image frame by a first accessibility engine, the first accessibility engine located on a virtualized desktop infrastructure (VDI) client running on a client device, the method comprising: accessing by the VDI client a remote virtual machine (VM), the remote VM being connected to the VDI client through a network; receiving by the first accessibility engine the image frame from the remote VM across the network; and processing the received image frame by the first accessibility engine to generate a first output, the first output comprising at least one of (a) a modified received image frame, or (b) metadata of the received image frame.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for processing frames of a virtualized desktop to improve accessibility for users, such as users with disabilities. The approach includes processing frames with an accessibility engine that is located on the client device of the user. The virtualized desktop runs on a virtual machine that is remote to the client device. The location of the accessibility engine on the client device, running on top of the operating system of the client device, allows advantages such as the ability to process frames that indicate a non-operational virtual machine, and the ability to provide accessibility independently of what type of guest operating system is running on the virtual machine. Another advantage is the ability to allow third parties to create plug-ins for the accessibility engine, because the accessibility engine of the present disclosure is not a privileged component that requires high security protections, as components of an operating system may require.

Figure 1:
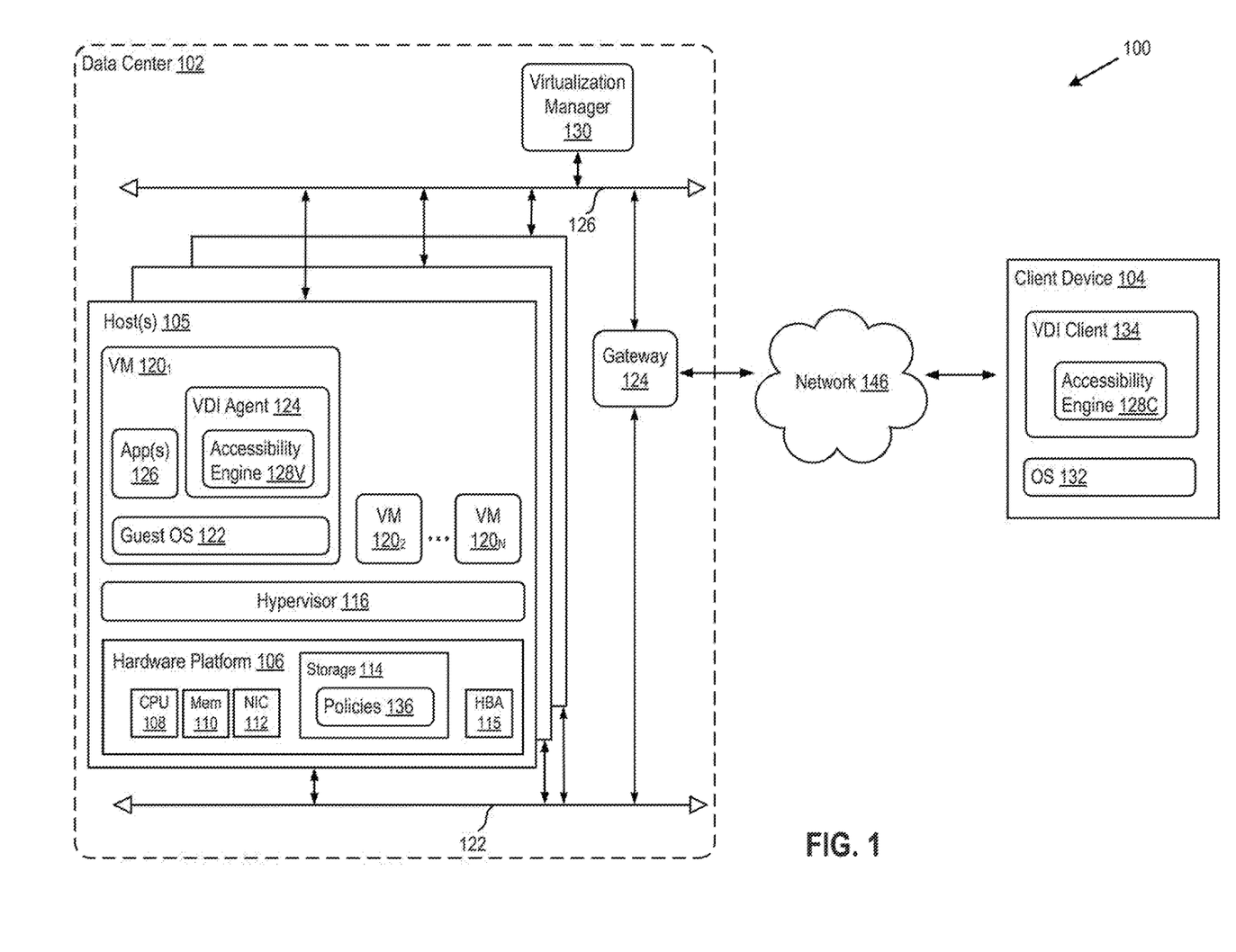
FIG. 1 depicts a block diagram of a virtualized desktop infrastructure system in which one or more embodiments of the present invention may be implemented.

FIG. 1 depicts a block diagram of a virtualized desktop infrastructure (VDI) system 100 in which one or more embodiments of the present invention may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134 and OS 132, with VDI client 134 running on top of OS 132. OS 132 may be a standard, commodity operating system.

VDI client 134 is a user-side interface of a virtualized desktop running on one of virtual machines (VMs) 120. As used herein, a "virtualized desktop" is a desktop running on one of VMs 120 that is displayed remotely on client device 104, as though the virtualized desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 at a certain frame rate using a desktop delivery protocol such as VMware® Blast™, or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off of client device 104. Such centralized and automated management of virtualized desktops provides increased control and cost savings. VDI client 134 may be, for example, VMware® View™, or a special purpose thin client such as those available from Dell, HP, NEC, Sun Microsystems, Wyse, and others.

VDI client 134 includes accessibility engine 128C. Accessibility engine 128C processes virtualized desktop frames received from data center 102 to provide accessibility services to users, such as users with disabilities. A disability may be, for example, epilepsy, hearing impairment, low proficiency in the language used on the virtualized desktop, vision impairment (myopia, colorblindness, hyperopia), and others. An accessibility service may be, for example, screen magnification, text translation, scene narration in audio format, or filtering of a frame through a color filter to provide better color differentiation for colorblind users.

The "C" in the numeral ("128C") of accessibility engine 128C denotes that accessibility engine 128C is located on client device 104. The "C" differentiates accessibility engine 128C from accessibility engine 128V located on VM 120 of data center 102. Accessibility engine 128C, accessibility engine 128V, and accessibility services are further described with reference to FIG. 2, below. As used herein, accessibility engines 128C/128V may be referred to as accessibility engine 128, without a "C" or a "V" in the numeral, when information presented applies to either accessibility engine 128C or 128V.

Data center 102 includes host(s) 105, a virtualization manager 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs 120$_1$ to 120$_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 105 without the use of a hypervisor. One example of a hypervisor 116 that may be used is a VMware ESXi™ hypervisor provided as part of the VMware vSphere® solution made commercially available from VMware, Inc. of Palo Alto, Calif.

Each VM 120 includes a guest OS 122, one or more applications 126, and a VDI agent 124. Application(s) 126 and VDI agent 124 run on top of guest OS 122. Guest OS 122 may be a standard, commodity operating system. An application 126 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the desktop running on VM 120 that contains VDI agent 124. An image frame includes information on appearance of the desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 126 open on the desktop, which application(s) 126 are running on and/or displayed on the desktop of VM 120, and other information.

VDI agent 124 includes accessibility engine 128V. Accessibility engine 128V is substantially similar to accessibility engine 128C. Both engines 128V and 128C process frames so as to make frames of the desktop running on VM 120 more accessible to users, such as users with disabilities. Accessibility engine 128V processes image frames before they are transmitted from VM 120 to VDI client 134. Accessibility engine 128C processes frames after they are received by VDI client 134. In an embodiment, only one of accessibility engines 128V and 128C is active, while the other is disabled. In this embodiment, one of accessibility engines 128V and 128C may be selected as the primary accessibility engine and the other as the secondary accessibility engine, with the secondary accessibility engine becoming activated if the health of the primary accessibility engine becomes low. This embodiment is further described with reference to FIG. 4, below.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

Storage 114 includes one or more policies 136. A policy 136 contains preferred accessibility settings of client device 104. An accessibility setting is an indication within policy 136 as to which features of accessibility engine 128 should be deactivate or activated, and to what degree. Policy 136 is read by a controller 214 (see FIG. 2) of accessibility engine 128, and controller 214 creates or modifies a value of a calibration variable based on settings within policy 136 so that accessibility engine 128 performs as per settings within policy 136. A calibration variable value is applied to accessibility engine 128 so as to turn on or off various features of accessibility engine 128.

For example, a user of client device 104 might not be proficient in the language in which guest OS 122 and applications 126 are presented. The user of client device 104 can therefore set policy 136 associated with client device 104 to translate all text within a remote desktop image frame from a given language to another language. In certain embodiments, a calibration variable pertaining to such a setting includes a value or several values that indicate whether a translation is to occur, and to which language the translation is to be performed. An additional setting within policy 136 can also specify whether the translation is to occur by generation of a playable audio file, by overlaying translated text on top of original text (e.g., through augmented reality), or both. A calibration variable for such a setting includes a value that indicates whether an audio file or a text overlay is to be performed by accessibility engine 128.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 124 provides VMs 120 and other components in data center 102 with connectivity to network 146. Gateway 124 may manage external public IP addresses for VMs 120, route traffic incoming to and outgoing from data center 102, and provide networking services, such as firewalls, network address translation (NAT), dynamic host configuration protocol (DHCP), and load balancing. Gateway 124 uses data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Figure 2:
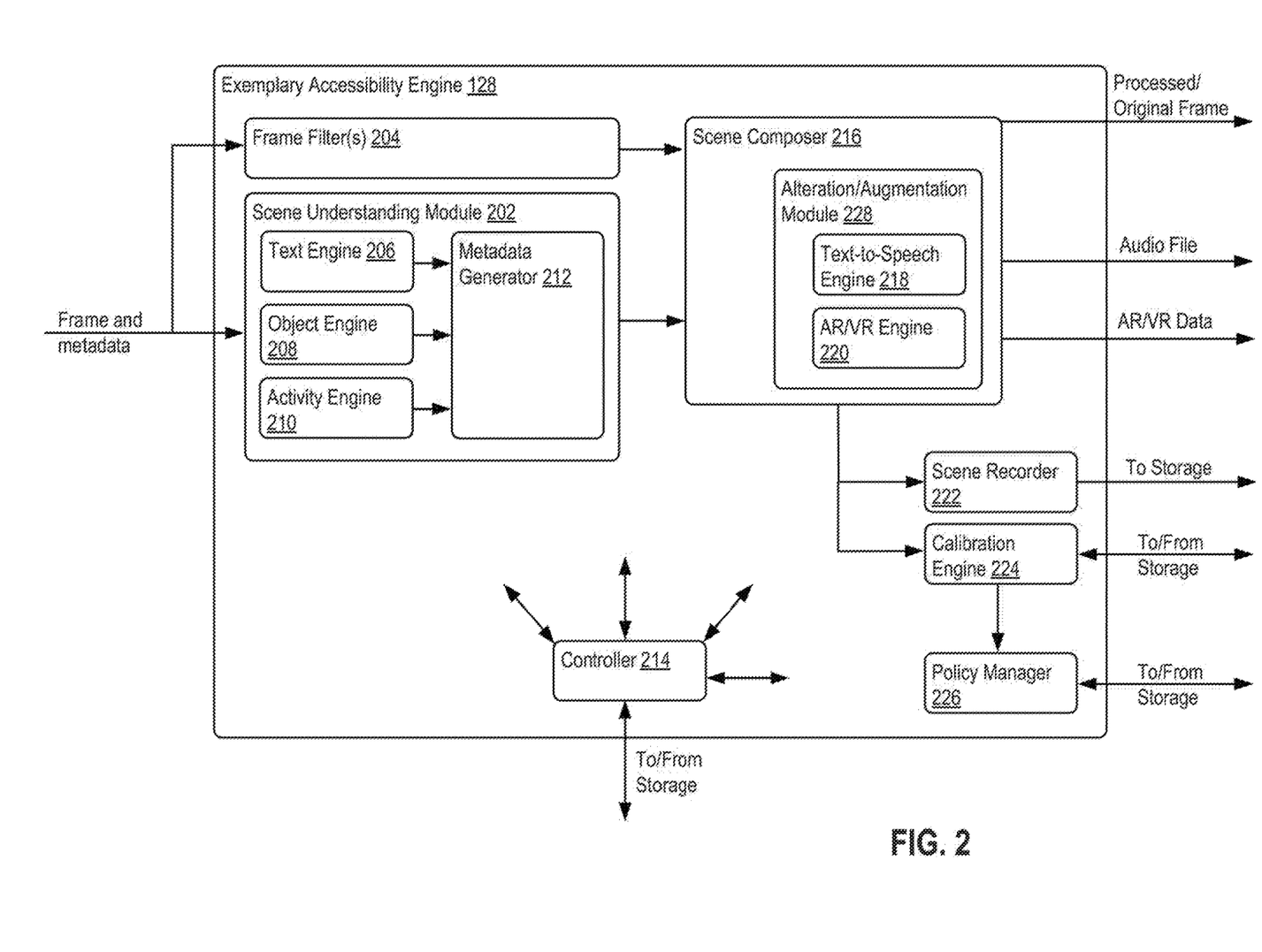
FIG. 2 depicts a block diagram of an exemplary accessibility engine, according to an embodiment.

FIG. 2 depicts a block diagram of an exemplary accessibility engine 128, according to an embodiment. FIG. 2 also shows exemplary data flow, as represented by arrows, between components of accessibility engine 128. Exemplary accessibility engine of FIG. 2 may be accessibility engine 128C or accessibility engine 128V.

Accessibility engine 128 includes one or more frame filters 204, a scene understanding module 202, a scene composer 216, a scene recorder 222, a calibration engine 224, a policy manager 226, and a controller 214.

Controller 214 is connected to components of accessibility engine 128, directly or indirectly, and is able to calibrate and turn on and off features of components of accessibility engine 128. In an embodiment, controller 214 is directly connected to all components of accessibility engine 128, and is able to control all components of accessibility engine 128, as shown by the arrows originating at controller 214. In another embodiment, controller 214 is directly connected to some but not all components of accessibility engine 128.

Upon connection of VDI client 134 to VDI agent 124, controller 214 retrieves previously saved values of calibration variables of client device 104, or contacts policy manager 226 to retrieve policy 136 of client device 104. Controller 214 then calibrates components of accessibility engine 128 as per retrieved policy 136 or calibration variable values, as described further below with reference to description of calibration engine 224 of FIG. 2. For example, controller 214 may calibrate accessibility engine 128 to turn off text-to-speech engine 218, because user of client device 104 is deaf and audio files would not be helpful for accessibility of virtualized desktop frames displayed on client device 104. Policy manager 226 is connected to storage 114 and upon request, retrieves policy 136 from storage 114, and transmits the retrieved policy 136 to the requesting component.

Frame filter(s) 204 is one or more filters that modify visual properties of a received image frame. When a frame is received by accessibility engine 128, and at least one filter 204 is activated by controller 214, as per policy 136 of client device 104, the frame is passed to one or more frame filter(s) 204 to modify at least a portion of the frame. A filter 204 may perform one of standard image filtering effects, such as rendering at least a portion of a frame sharper, blurrier, brighter, darker, warmer, cooler, etc. Filter 204 may change colors of at least a portion of the received frame to make the colors more distinguishable for a user with a certain type of colorblindness (e.g., deuteranopia, protanomaly, etc.). Filter 204 may also magnify a portion of the frame, such as the portion around the mouse cursor to create a magnifying glass effect. Filter 204 may darken at least a portion of a frame, such as to prevent sudden screen flashes for users with epilepsy.

Before a frame is received by frame filter(s) 204 and/or scene understanding module 202, the frame may be preprocessed by a preprocessing module (not shown), which may, for example, remove noise from the frame, blur the frame for certain artificial intelligence (AI) object recognition tasks, or perform other preprocessing tasks.

Scene understanding module 202 generates metadata for a received frame. Scene understanding module 202 receives a frame, and optionally metadata of the frame, and generates additional metadata for the frame to aid with understanding or perception of the frame by user of client device 104. Exemplary components of scene understanding module 202 are text engine 206, object engine 208, activity engine 210, and metadata generator 212.

Text engine 206 analyzes the frame received by scene understanding module 202, as well as optionally analyzes received metadata of the frame. Text engine 206 analyzes the frame to find text within the frame. Text engine 206 generates information or metadata regarding the located text. The generated information or metadata may be a translated version of the text from one language to another, location and size of text within the frame, etc. Text engine 206 transmits the text information or metadata to metadata generator 212.

Object engine 208 analyzes the received frame, as well as optionally frame metadata, to locate objects within the frame. For example, object engine 208 locates various clickable application icons arranged on the desktop running on VM 120. Object engine 208 may also locate application windows that are open and displayed on the desktop running on VM 120. Object engine 208 generates information or metadata regarding these objects, such as object location (e.g., x and y coordinates) on the frame, size, and type. Object engine 208 transmits the object information or metadata to metadata generator 212.

Activity engine 210 analyzes the received frame, as well as optionally frame metadata, to recognize certain events occurring on VM 120. For example, activity engine 210 may analyze the received frame to determine whether an error message is displayed or whether guest OS 122 of VM 120 has experienced kernel failure. An error message may indicate, for example, that VM 120 has experienced a fatal error and is non-operational, preventing further interaction between user and the virtualized desktop. The error may be displayed in the form of a "purple screen of death." Such an error may be difficult to notice for a disabled user, because the virtualized desktop becomes unresponsive in such cases. Also, such an error is not detectable by accessibility engine 128V that is running on VM 120, because if VM 120 is non-operational, then so is accessibility engine 128V. But such an error is detectable by activity engine 210 of accessibility engine 128C, running on OS 132 of client device 104, because accessibility engine 128C does not depend on operability of VM 120. For another example, activity engine 210 may notice that an application 126 is in the process of being opened or closed, and may generate metadata to indicate this, which may result in a narration of the event, such as "Closing application X." Activity engine 210 generates information or metadata on detected events, and transmits the event information or metadata to metadata generator 212.

Metadata generator 212 receives information or metadata from components of scene understanding module 202, the components being for example, text engine 206, object engine 208, or activity engine 210. Metadata generator 212 may analyze the information received from other components of scene understanding module 202, and metadata generator 212 creates metadata out of the information for consumption or use by scene composer 216. Metadata generator 212 may analyze information and metadata received to create higher order metadata out of received metadata or information, such as for example, combining text data of an application icon and object data of that icon to create metadata indicating which software application is represented by the application icon. Metadata generator 212 may merely repackage received metadata for scene composer 216, without generating new metadata.

Scene composer 216 receives the originally received or processed image frame, along with originally received metadata and/or metadata from scene understanding module 202, and scene composer 216 then combines the information, metadata, and image frame to compose a completed or nearly completed image frame for presentation on client device 104. For example, scene composer may delete text and overlay translated text, in the same font, in the location of the frame where original text had been. Scene composer 216 may engage an alteration/augmentation module 228 to further modify a frame or add to a frame.

FIG. 2 shows two exemplary components of alteration/augmentation module 228: text-to-speech engine 218 and augmented reality (AR)/virtual reality (VR) engine 220. Text-to-speech engine 218 receives text data and metadata of the text data to generate an audio file that audibly reads the text. AR/VR engine 220 receives a frame and modifies it for AR or VR applications or devices. For example, client device 104 may be a VR device such as VR glasses, or client device 104 may be connected to VR glasses. Application 126 may be a VR application. AR/VR engine may modify a frame to be compatible with the display format of VR glasses. For another example, client device 104 may be AR glasses, application 126 may be an AR application, and AR/VR engine 220 might overlay visual effects on the frame, such as an animated character that acts as a personal assistant. Scene composer 216 sends its output to client device 104, which presents the output on one or more output devices (not shown), such as a display screen and/or audio speaker. Output of scene composer 216 may include a processed or unprocessed frame, audio file, AR/VR metadata, or a combination of these.

Scene composer 216 may send its output, or a portion of its output, to scene recorder 222. Scene recorder 222 records output of scene composer by placing the output onto storage, such as storage 114.

Scene composer 216 may send its output, or a portion of its output, to calibration engine 224. Calibration engine 224 analyzes the output and compares the output to accessibility settings within policy 136 associated with client device 104. Calibration engine 224 may obtain policy 136 by requesting policy 136 from policy manager 226 or by requesting directly from storage 114. If any aspect of the output does not comply with accessibility settings of policy 136, then calibration engine 224 modifies values of calibration variables so as to comply with accessibility settings of policy 136.

Calibration engine 224 transmits the values to controller 214. Controller 214 uses the values to recalibrate components of accessibility engine 128. For example, if calibration engine 224 determines that the frame of the output of scene composer 216 is too bright, then calibration engine 224 may set a value of a calibration variable pertaining to one of filters 204 so as to increase darkness of one of filters 204. Calibration engine 224 then transmits the value to controller 214. Controller 214 recalibrates or creates a new filter 204 that adds darkness to a frame when the frame is too bright. Controller 214 may save within storage 114 the new value of calibration variable pertaining to filter 204 for future calibration of accessibility engine 128 when connected to client device 104.

Accessibility engine 128 may also have a developer module (not shown) that can be accessed by software engineers or developers to test performance of accessibility engine 128. The developer module may allow manual calibration of components of accessibility engine 128.

Figure 3:
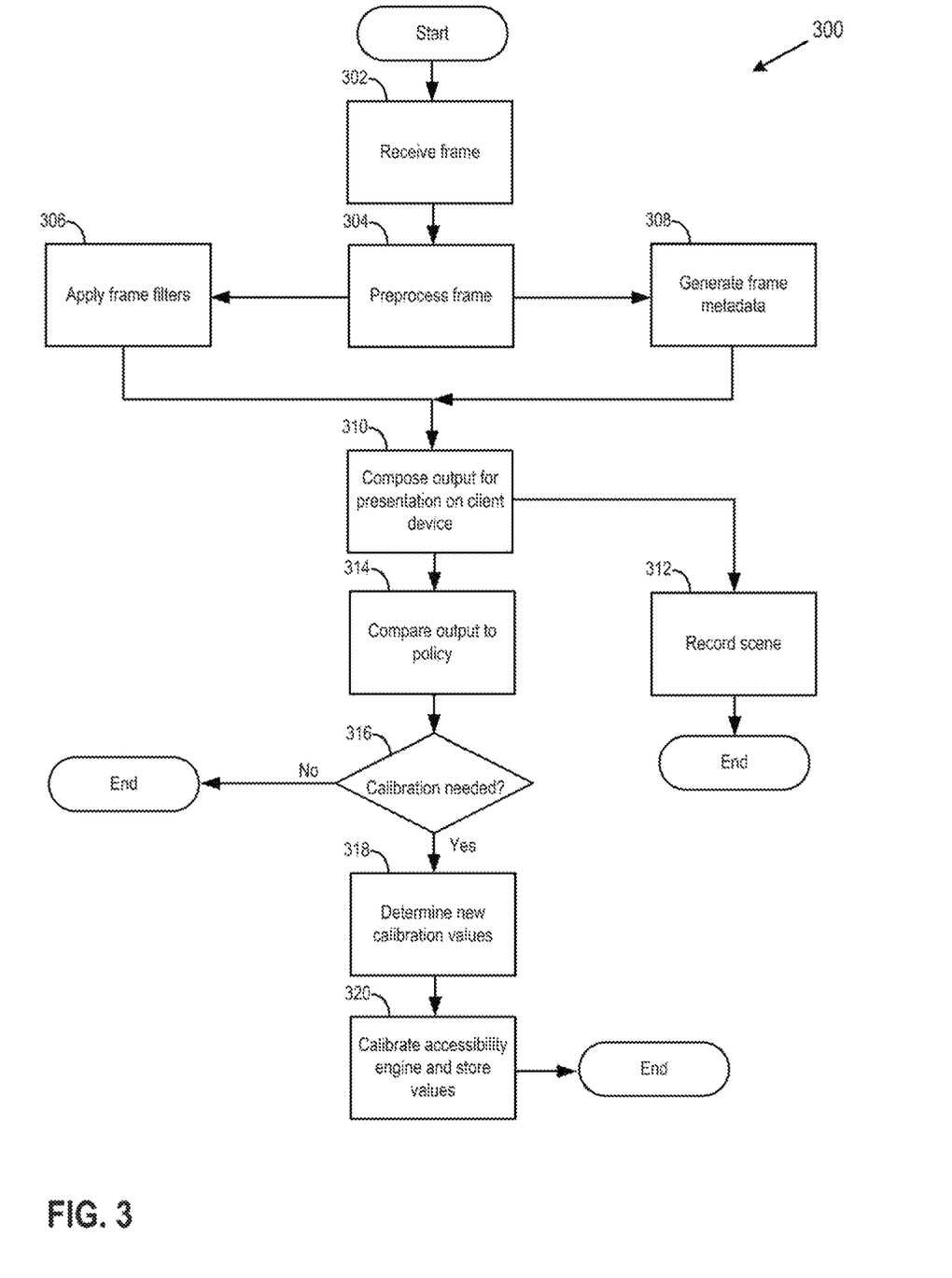
FIG. 3 depicts a flow diagram of a method of processing an image frame, according to an embodiment.

FIG. 3 depicts a flow diagram of a method 300 of processing an image frame, according to an embodiment. Method 300 may be performed by accessibility engine 128C or 128V. Method 300 is triggered for each frame sent to VDI client 134 when at least one of accessibility engines 128V or 128C is activated for processing frames to be presented (e.g., displayed) on client device 104.

At step 302, an image frame is received by accessibility engine 128. Along with the image frame, accessibility engine 128 may also receive metadata associated with the frame, such as coordinates of objects within the frame, information as to which objects are in the frame, size of objects, position of mouse pointer, etc.

At step 304, accessibility engine 128 preprocesses the frame received at step 302. Step 304 is optional, and may or may not be performed depending on settings within policy 136 pertaining to client device 104. Preprocessing may include noise removal, sharpness modification, etc. In an embodiment, preprocessing includes processing that can be performed by filters 204. After step 304, method 300 continues to one or both of steps 306 and 308. Steps 306 and 308 may be performed in parallel.

At step 306, accessibility engine 128 applies one or more filters 204 to the frame of step 302 or 304. At step 308, accessibility engine 128 generates information and metadata of frame of step 302 or 304 by using various components of scene understanding module 202, as shown in FIG. 2 and described above.

At step 310, information and metadata of step 308 is combined with the frame of step 302, 304, or 306 to create output that is to be presented on client device 104. Step 310 may be performed by scene composer 216. As part of step 310, accessibility engine 128 may make further modifications to the frame or generate additional metadata or data. For example, at step 310, the frame may be further modified for display on a VR device, or an audio file may be generated as part the output, as described above with reference to scene composer 216. After step 310, method 300 ends or continues to one of steps 312 or 314, or to both steps. Steps 314-320 may be performed in parallel with step 312.

At step 312, the output composed in step 310 is recorded, such as by storing the output on storage 114 or on another storage device. The recording may be performed by scene recorder 222.

At step 314, accessibility engine 128 compares the output of step 310 to policy 136 associated with client device 104 or with user of client device 104. Step 314 may be performed by calibration engine 224 of accessibility engine 128.

At step 316, accessibility engine 128 determines whether output of step 310 complies with policy 136. If the output complies, then calibration is not needed and method 300 ends. If the output does not comply, then calibration is needed and method 300 continues to step 318. Step 316 may be performed by calibration engine 224 of accessibility engine 128.

At step 318, accessibility engine 128 determines new values for one or more calibration variables of accessibility engine 128. For example, accessibility engine 128 may determine that the processed frame is not sharp enough, and may change value of a calibration variable that when applied, will activate one of filters 204 to improve image sharpness. Step 318 may be performed by calibration engine 224 of accessibility engine 128.

At step 320, accessibility engine 128 recalibrates one or more components of calibration engine 128, as per new values determined at step 318. Step 320 may be performed by controller 214 after receiving calibration values from calibration engine 224. For example, controller may activate a filter 204 to improve sharpness of image frame that is displayed on client device 104.

Figure 4:
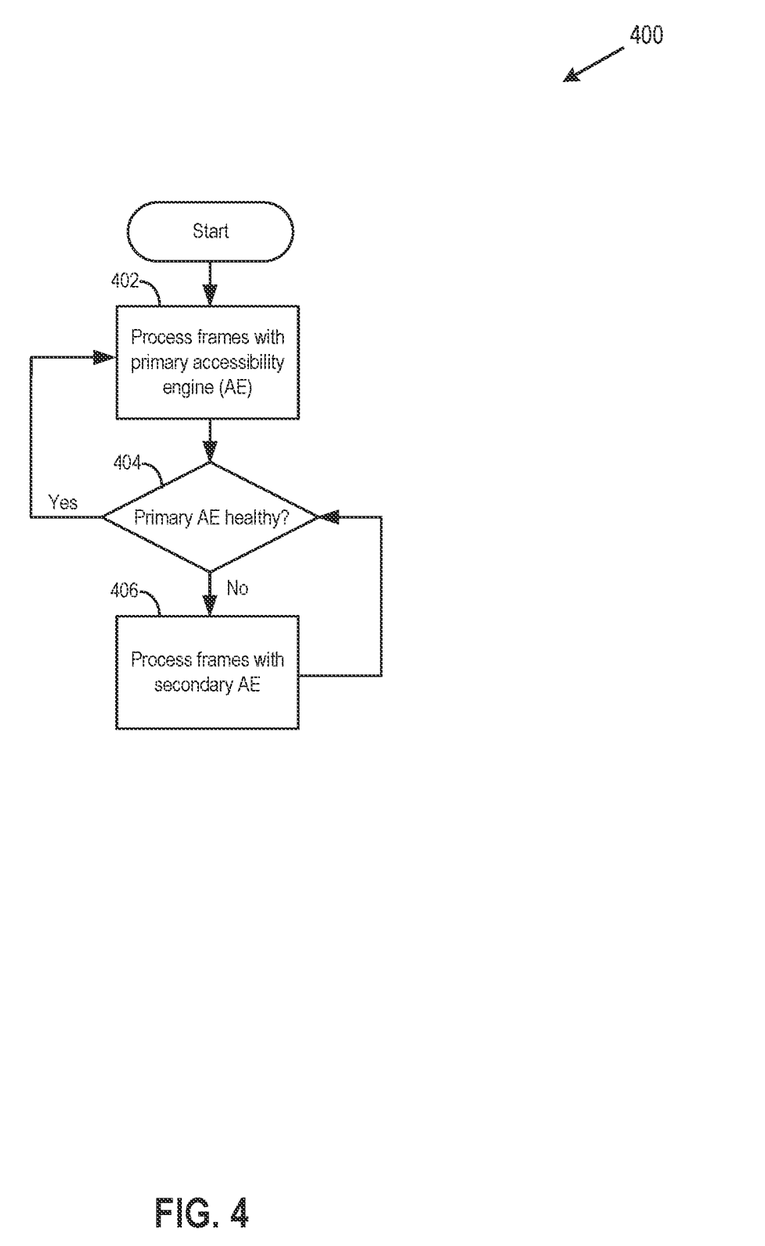
FIG. 4 depicts a flow diagram of a method of activating and deactivating accessibility engines, according to an embodiment.

FIG. 4 depicts a flow diagram of a method 400 of activating and deactivating accessibility engines 128C and 128V, according to an embodiment. Method 400 may be performed in parallel with method 300. Method 400 may be triggered when a connection between VDI agent 124 and VDI client 134 is established. Before starting method 400, one of accessibility engines 128V or 128C may be designated as "primary" accessibility engine, and the other may be designated as "secondary." The primary accessibility engine 128 is the preferred engine to process frames and metadata so as to improve accessibility. The secondary accessibility engine 128 takes over if the health of the primary accessibility engine 128 is low.

At step 402, frames are processed using primary accessibility engine 128. The processing may be performed by executing method 300 of FIG. 3. In an embodiment, when frames are processed by primary accessibility engine 128, frames are not processed by secondary accessibility engine 128. After step 402, method 400 continues to step 404. The transition from step 402 to 404 may occur after a time delay. The delay may be, for example, one millisecond, one second, five seconds, twenty seconds, one minute, or ten minutes.

At step 404, a component of VDI system 100 checks whether the primary accessibility engine 128 is healthy. The component that performs step 404 may be the secondary accessibility engine 128 or another component such as virtualization manager 130. If primary accessibility engine 128 is healthy, method 400 returns to step 402. If primary accessibility engine 128 is not healthy, method 400 continues to step 406.

Health of an accessibility engine may be considered "low" or "not healthy" if, for example, accessibility engine 128 is unresponsive or is slow to respond. Health of accessibility engine 128V may be considered low if resources available to VM 120 (that hosts accessibility engine 128V) become low. Availability of resources of VM 120 may be determined by referring to, for example, percent CPU utilization or storage/memory utilization of host 105 hosting VM 120. Health of accessibility engine 128C may be considered low if resources available to client device 104 become low. Availability of resources of client device 104 may be determined by referring to, for example, percent CPU utilization or storage/memory utilization of client device 104.

At step 406, frames are processed by the secondary accessibility engine 128. In an embodiment, when frames are processed by secondary accessibility engine 128, frames are not processed by primary accessibility engine 128. After step 406, method 400 returns to step 404. The transition from step 406 to 404 may occur after a time delay. The delay may be, for example, the same time period as the delay for the transition between steps 402 and 404.

Figure 5:
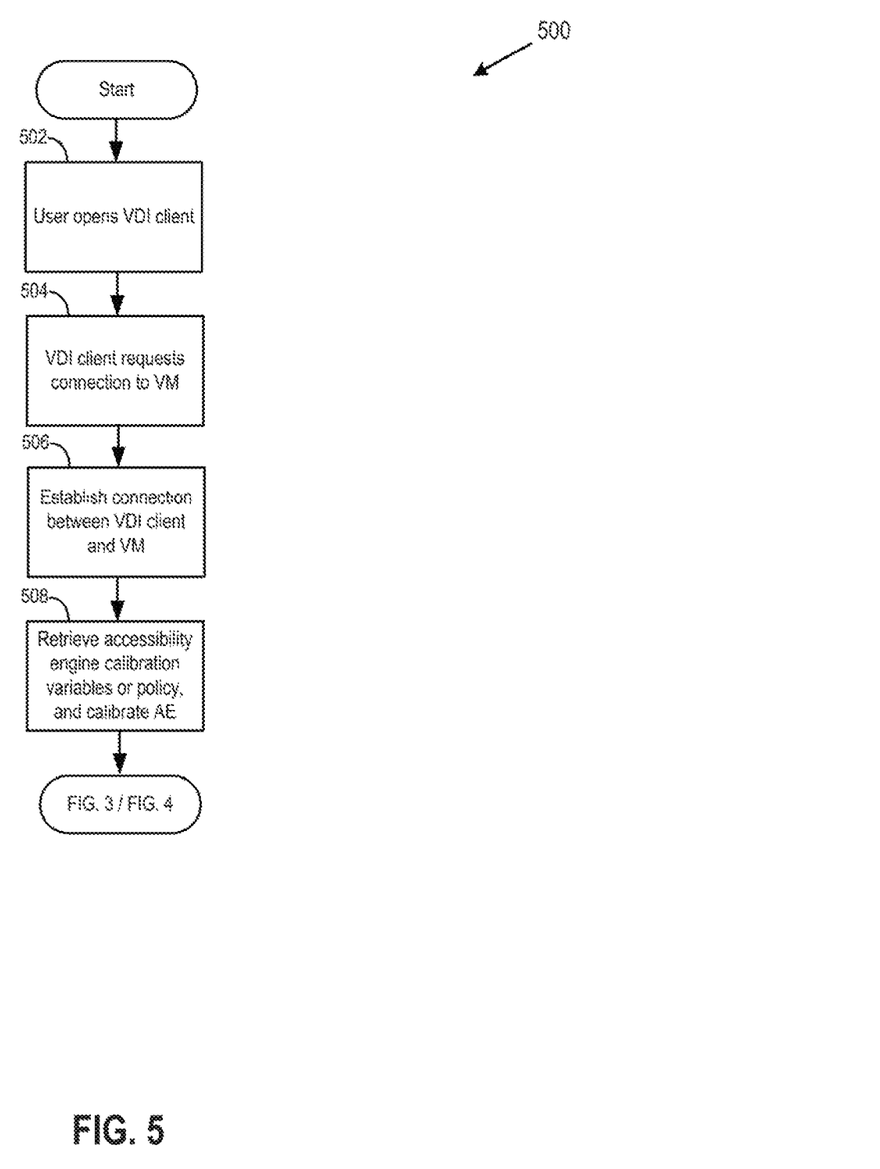
FIG. 5 depicts a flow diagram of a method of calibrating one or more accessibility engines upon connection between a virtualized desktop infrastructure agent and a virtualized desktop infrastructure client.

FIG. 5 depicts a flow diagram of a method 500 of calibrating one or more accessibility engines upon connection between VDI agent 124 and VDI client 134. At step 502, user of client device 104 opens VDI client 134. The opening may occur by, for example, double-clicking an icon for desktop virtualization software by a user of client device 104.

At step 504, VDI client 134 passes identification information of a user or of client device 104 to data center 102, and VDI client 134 requests a connection to one of VMs 120. The identification information may be, for example, a username and password pair, or a MAC address of client device 104.

At step 506, virtualization manager 130 provisions a VM 120 for connection to VDI client 134, guest OS 122 opens a VDI agent 124 within the provisioned VM, and guest OS 122 or virtualization manger 130 establishes a connection between VDI client 134 and VDI agent 124.

At step 508, controller 214 of accessibility engine 128V retrieves previously stored values of calibration variables associated with client device 104 or the user of client device 104, and calibrates accessibility engine 128V. If stored calibration variables are not available, then controller 214 contacts calibration engine 224. Calibration engine 224 retrieves policy 136 associated with client device 104 or the user of client device 104, determines values for calibration variables that are designed to result in frame processing compliant with policy 136, and passes those values to controller 214. Controller 214 then calibrates accessibility engine 128V as per the values received from calibration engine 224.

Similar steps as described for step 508 may be performed on client device 104 to calibrate accessibility engine 128C. Alternatively, once one of accessibility engines 128 is calibrated, the calibrated accessibility engine 128 passes values of calibration variables to the other calibration engine 128, and controller 214 of the other accessibility engine 128 uses the received values to calibrate components on its accessibility engine 128. After step 508, method 500 ends, and one or both of methods 300 or 400 may be triggered.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of processing an image frame by a first accessibility engine, the first accessibility engine located on a virtualized desktop infrastructure (VDI) client running on a client device, the method comprising:
  accessing, by the VDI client, a remote virtual machine (VM) running on a host device, the remote VM being connected to the VDI client through a network;
  receiving, by the first accessibility engine, the image frame from the remote VM across the network;
  analyzing, by the first accessibility engine, contents of the received image frame to determine one or more events of the received image frame, wherein the contents of the received image frame comprise an error message, and wherein the one or more events comprise a fatal error;
  detecting, by the first accessibility engine, based on the determined one or more events, that the remote VM is not operational;
  based on the detecting that the remote VM is not operational, processing the received image frame, by the first accessibility engine, according to an accessibility policy associated with the client device to generate a first output, the first output comprising metadata generated by the first accessibility engine for the received image frame, wherein the first output is based on the one or more events, and wherein the metadata comprises an indication that the remote VM is not operational;
  composing, by the first accessibility engine, a composite image frame for display on the client device, the composite image frame being a combination of data from the received image frame and data from the metadata generated by the first accessibility engine for the received image frame; and
  displaying, by the client device, the composite image frame.

2. The method of claim 1, wherein the host device comprises a second accessibility engine, wherein the first accessibility engine is a primary accessibility engine, and the second accessibility engine is a secondary accessibility engine, the method further comprising:
  determining a health of the primary accessibility engine is low; and
  based on the determining, handling processing of image frames according to the accessibility policy by the secondary accessibility engine at the host device instead of handling processing of image frames according to the accessibility policy by the primary accessibility engine at the client device.

3. The method of claim 1, the method further comprising:
  prior to receiving the image frame, calibrating the first accessibility engine;
  comparing the first output to the accessibility policy associated with the client device, the accessibility policy comprising an indication of a degree to which features of the first accessibility engine should be activated; and
  based on the comparing, recalibrating the first accessibility engine so future outputs comply with the accessibility policy.

4. The method of claim 1, wherein the first output further comprises an audio file generated at least in part based on the metadata generated for the received image frame.

5. The method of claim 1, wherein the processing the received image frame further comprises detecting text within the received image frame.

6. The method of claim 1, the method further comprising storing the first output on a storage device.

7. The method of claim 1, wherein the composite image frame comprises the received image frame modified at least in part by magnification, a color filter, or a sharpness filter.

8. A non-transitory computer readable medium comprising instructions to be executed in a processor of a computer system, the instructions when executed in the processor cause the computer system to carry out a method of processing an image frame by a first accessibility engine, the first accessibility engine located on a virtualized desktop infrastructure (VDI) client running on a client device, the method comprising:
  accessing, by the VDI client, a remote virtual machine (VM) running on a host device, the remote VM being connected to the VDI client through a network;
  receiving, by the first accessibility engine, the image frame from the remote VM across the network;
  analyzing, by the first accessibility engine, contents of the received image frame to determine one or more events of the received image frame, wherein the contents of the received image frame comprise an error message, and wherein the one or more events comprise a fatal error;
  detecting, by the first accessibility engine, based on the determined one or more events, that the remote VM is not operational;
  based on the detecting that the remote VM is not operational, processing the received image frame, by the first accessibility engine, according to an accessibility policy associated with the client device to generate a first output, the first output comprising metadata generated by the first accessibility engine for the received image frame, wherein the first output is based on the one or more events, and wherein the metadata comprises an indication that the remote VM is not operational;
  composing, by the first accessibility engine, a composite image frame for display on the client device, the composite image frame being a combination of data from the received image frame and data from the metadata generated by the first accessibility engine for the received image frame; and
  displaying, by the client device, the composite image frame.

9. The non-transitory computer readable medium of claim 8, wherein the host device comprises a second accessibility engine, wherein the first accessibility engine is a primary accessibility engine, and the second accessibility engine is a secondary accessibility engine, the method further comprising:
  determining a health of the primary accessibility engine is low; and
  based on the determining, handling processing of image frames according to the accessibility policy by the secondary accessibility engine at the host device instead of handling processing of image frames according to the accessibility policy by the primary accessibility engine at the client device.

10. The non-transitory computer readable medium of claim 8, the method further comprising:
   prior to receiving the image frame, calibrating the first accessibility engine;
   comparing the first output to the accessibility policy associated with the client device, the accessibility policy comprising an indication of a degree to which features of the first accessibility engine should be activated; and
   based on the comparing, recalibrating the first accessibility engine so future outputs comply with the accessibility policy.

11. The non-transitory computer readable medium of claim 8, wherein the first output further comprises an audio file generated at least in part based on the metadata generated for the received image frame.

12. The non-transitory computer readable medium of claim 8, wherein the processing the received image frame further comprises detecting text within the received image frame.

13. The non-transitory computer readable medium of claim 8, the method further comprising storing the first output on a storage device.

14. The non-transitory computer readable medium of claim 8, wherein the composite image frame comprises the received image frame modified at least in part by magnification, a color filter, or a sharpness filter.

15. A computer system comprising:
   a client device comprising a virtualized desktop infrastructure (VDI) client running on the client device;
   a first accessibility engine located on the VDI client;
   a network;
   a remote virtual machine (VM) connected to the VDI client through the network, the remote VM running on a host device; and
   a processor, wherein the processor is programmed to carry out a method of processing an image frame by the first accessibility engine, the method comprising:
      accessing, by the VDI client, the remote VM;
      receiving, by the first accessibility engine, the image frame from the remote VM across the network;
      analyzing, by the first accessibility engine, contents of the received image frame to determine one or more events of the received image frame, wherein the contents of the received image frame comprise an error message, and wherein the one or more events comprise a fatal error;
      detecting, by the first accessibility engine, based on the determined one or more events, whether the remote VM is operational;
      based on the detecting that the remote VM is not operational, processing the received image frame, by the first accessibility engine, according to an accessibility policy associated with the client device to generate a first output, the first output comprising metadata generated by the first accessibility engine for the received image frame, wherein the first output is based on the one or more events, and wherein the metadata comprises an indication that the remote VM is not operational;
      composing, by the first accessibility engine, a composite image frame for display on the client device, the composite image frame being a combination of data from the received image frame and data from the metadata generated by the first accessibility engine for the received image frame; and
      displaying, by the client device, the composite image frame.

16. The computer system of claim 15, wherein the host device comprises a second accessibility engine, wherein the first accessibility engine is a primary accessibility engine, and the second accessibility engine is a secondary accessibility engine, the method further comprising:
   determining a health of the primary accessibility engine is low; and
   based on the determining, handling processing of image frames according to the accessibility policy by the secondary accessibility engine at the host device instead of handling processing of image frames according to the accessibility policy by the primary accessibility engine at the client device.

17. The computer system of claim 15, the method further comprising:
   prior to receiving the image frame, calibrating the first accessibility engine;
   comparing the first output to the accessibility policy associated with the client device, the accessibility policy comprising an indication of a degree to which features of the first accessibility engine should be activated; and
   based on the comparing, recalibrating the first accessibility engine so future outputs comply with the accessibility policy.

* * * * *